United States Patent
Larrue

(10) Patent No.: US 6,168,272 B1
(45) Date of Patent: Jan. 2, 2001

(54) SPECTACLE FRAME WITH ELEMENTS OF SUPERELASTIC ALLOY

(75) Inventor: Denis Larrue, Longchamois (FR)

(73) Assignee: A. Lu. Tec. Association Lunetiere Technologique, Morez (FR)

(*) Notice: Under 35 U.S.C. 154(b), the term of this patent shall be extended for 0 days.

(21) Appl. No.: 09/443,707

(22) Filed: Nov. 19, 1999

Related U.S. Application Data

(63) Continuation of application No. PCT/IB98/00726, filed on May 14, 1998.

(30) Foreign Application Priority Data

May 20, 1997 (FR) .................................................. 97 06406

(51) Int. Cl.$^7$ ...................................................... G02C 1/00
(52) U.S. Cl. ............................. 351/41; 351/111; 351/114
(58) Field of Search ............................. 351/41, 111, 114, 351/124, 158

(56) References Cited

U.S. PATENT DOCUMENTS 4,976,529 * 12/1990 Segoshi et al. .......................... 351/41
4,983,029 * 1/1991 Sato ...................................... 351/41
5,452,028 * 9/1995 Iijima ................................... 351/41

FOREIGN PATENT DOCUMENTS

| | | |
|---|---|---|
| 33 09 365 | 12/1983 | (DE) . |
| 33 07 442 | 9/1984 | (DE) . |
| 0 187 937 | 7/1986 | (EP) . |
| 0 648 856 | 4/1995 | (EP) . |
| 2 504 284 | 10/1982 | (FR) . |
| 87 07961 | 12/1987 | (WO) . |
| 96 24086 | 10/1996 | (WO) . |

* cited by examiner

Primary Examiner—Hung Xuan Dang
(74) Attorney, Agent, or Firm—Henderson & Sturm LLP

(57) ABSTRACT

The invention concerns a frame for spectacles comprising at least one element made of polycrystalline copper—aluminum—beryllium (Cu—Al—BE) of elasticity between 3 and 6%, preferably of the order of 4%. The polycrystalline alloy composition is 0.5% to 1% of beryllium, 11% to 12% of aluminum, the remainder being copper. The polycrystalline alloy average grain size is less than 0.12 mm. The Cu—Al—BE element is formed by several shrinking operations not exceeding deformation of $\frac{1}{100}$ th of a millimeter per passage, or 40% of clod shrinking, followed by thermal beta treatment or directly by hot-forming.

14 Claims, 1 Drawing Sheet

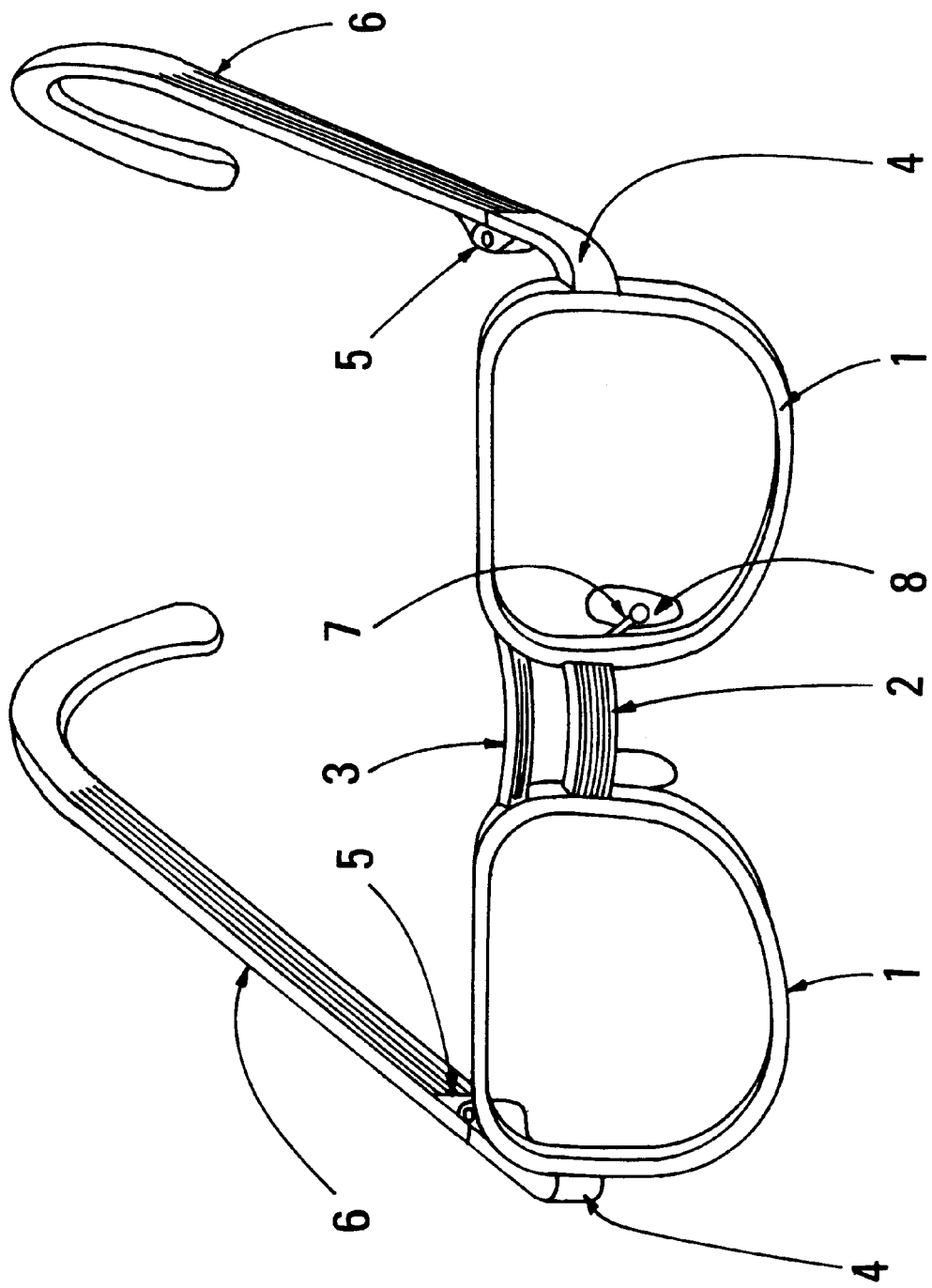

SPECTACLE FRAME WITH ELEMENTS OF SUPERELASTIC ALLOY

This application is a continuation of PCT/IB98/00726 filed May 14, 1998.

BACKGROUND OF THE INVENTION

1. Field of the Invention

The present invention relates to a spectacle frame whereof certain elements, notably the temples, the connecting piece (s) between the lens rim (eyewire), or the supports for the nasal pads, are made of a so-called "shape-memory" material having a superelasticity (or pseudo-elasticity).

2. Description of the Prior Art

By material with a shape-memory is meant any metallic alloy able to adopt a first shape while in a first martenisite phase at high temperature and a second shape while in a second austenitic crystalline phase at low temperature. To be able to pass from one state to the other, the material has a great elasticity, or superelasticity, namely its minimum elastic deformation without irreversible plastic transformation can reach 6% or even 11%, compared to the usual value of only 0.2% for common metals.

This superelasticity property is of interest for the production of elements of spectacle frames. For instance, if the connecting bridge for the lens rims is made of such material, the frame can be crushed without breaking. If a temple is made of such material, it can be twisted and folded without risk of rupture, so that one may even envisage dispensing with the hinge connecting it to the front-piece consisting of the lens rims assembled by a bridge.

U.S. Pat. Nos. 4,772,112 and 4,896,955 describe spectacle frames comprising elements of superelastic material based on a Nickel—Titanium (Ni—Ti) alloy. However, nickel can cause allergies to a person wearing such spectacles. Moreover, it is very difficult to assemble these elements in Ti—Ni alloy to elements of other metals commonly used in spectacle frames (Monel, nickel—silver, bronze, copper—beryllium, stainless steels or titanium alloys) and joining with such materials is unreliable over time.

WO 96/24086 describes the use of a monocrystalline resilient memory alloy selected from Cu based alloys: Cu—Zn—Al, Cu—Al—Ni or Cu—Al—Be to make elements of spectacle frames, notably the temples and bridges. By virtue of their monocrystalline structure, these alloys possess a capacity for superelastic deformation greater than 11% between −40° C. and +80° C. However, with this superelasticity it is impossible to shape the elements by the usual bending or hammering (shrinking) operations such as are used in the optical trade, the only possible shaping being under stress at high temperature, which is very costly. Moreover, such spectacle frames become rubbery to such an extent that they are no longer able to properly hold correcting lenses exactly in position relative to the eyes. As a result, there is a risk that the wearer suffers from aberrations of the view, particularly in the case of bifocal lenses.

BRIEF SUMMARY OF THE INVENTION

The present invention aims to provide a spectacle frame with superelastic elements that can be repetitively bent and folded at given locations, or even temporarily crushed, without breaking or becoming permanently deformed, but which can also firmly hold correcting lenses exactly in position relative to the eyes.

These aims are achieved by a spectacle frame having at least one element made of a polycrystalline Copper—Aluminum—Beryllium (Cu—Al—Be) alloy of elasticity limit comprised between 3 and 6%, preferably of the order of 4%.

Advantageously, the composition of the polycrystalline alloy is from 0.5% to 1%, preferably 0.63% by weight Beryllium, and from 11% to 12%, preferably 11.8% by weight Aluminum, with the remainder of Copper.

Advantageously, the mean grain size of the polycrystalline alloy does not exceed 0.12 mm.

The alloy composition is such that there is practically no risk of allergy with the wearers' skin. By voluntarily restricting to a particular composition in polycrystalline form with predefined grain size, the elasticity is established with a value sufficient to support accidental bending without however undergoing permanent deformation and while being able to hold the lenses correctly relative to the eyes.

Advantageously, therefore, the Cu—Al—Be element is shaped by one or more hammering or cold forming operations not exceeding $5/100$ mm of deformation per passage, namely 40% shrinkage for a wire.

Usefully, after a hammering operation the Cu—Al—Be element undergoes a so-called thermal beta treatment at a temperature exceeding the allotopic transformation temperature of the alloy, of the order of 650° C., followed by rapid cooling to relax the internal stresses created during hammering or cold forming.

Thanks to the specific chosen composition of the alloy, shaping by shrinkage remains possible even if several passages are required. Apart from the ability to be able to shape the superelastic element, it is observed that this operation also improves its surface state, transforming it from an "orange peel" state after degreasing following drawing, into a perfectly smooth state.

Alternatively, shaping of the Cu—Al—Be element may be carried out hot, in particular at a temperature above 650° C. during a heating time less than 15 seconds/gram of material to be heated, preferably of the order of 1 second if the element has been preheated, or between 10 and 15 seconds if the element has not been preheated. This shaping is then followed by rapid cooling to ambient temperature.

Advantageously then, the Cu—Al—Be element may for example be assembled with a part of Monel by brasing with a silver-based solder in paste or wire form, at a temperature of the order of 700° C. using induction or resistance heating, which is particularly well adapted to optical applications due to the fact that it allows well-controlled local heating.

After extensive workshop testing, it has been observed that this welding/brasing permits the ends of bridges to be assembled parallel and arched against the lens rims, and also to be assembled end-on orthogonal to these rims.

Advantageously, the Cu—Al—Be element is plated with a surface layer of Copper or Nickel by a galvanic treatment independent of the galvanic treatment of other parts of the frame, such that a subsequent coating on this underlayer of gold, or any other final coating (gold or palladium) conventionally used in the optical trade, is perfectly smooth.

BRIEF DESCRIPTION OF THE SEVERAL VIEWS OF THE DRAWINGS

The invention will be better understood from the following description of an embodiment given by way of non-limiting example and with reference to the annexed Figure representing a spectacle frame.

FIG. 1, referred to hereinafter as the Figure, shows a frame built in accordance with the present invention.

DETAILED DESCRIPTION OF THE INVENTION

As shown in the Figure, a spectacle frame comprises two rims 1 for supporting correcting or solar lenses of glass or organic material. In the illustrated example, these rims are secured together by two straight bridges 2 and 3, forming therewith a front-piece of a spectacle frame. One of the bridges 2 may, for example, be larger than the other, 3. On either side of the front-piece is attached a curved lug or end-piece whose end carries a hinge-element, usually female, of a hinge 5 for connecting a temple 6 to the front-piece. Additionally, a U-shaped rod welded to the bridge, or a pair of arms 7 welded directly to each rim, carries/carry a pair of pads 8 for resting on the wearer's nose.

More particularly according to the invention, the bridges 2, 3 of the front-piece and the temples 6 are made of a polycrystalline Copper—Aluminum—Beryllium (Cu—Al—Be) alloy comprising 0.5% to 1%, preferably 0.63% by weight Beryllium, from 11% to 12%, preferably 11.8% by weight Aluminum, and the remainder Copper, with a mean grain size less than 0.12 mm. This particular composition with polycrystalline structure of medium grains has specific superelastic properties comprised between 3 and 6%, for example close to 4%, for the bridges 2 and temples 6.

Such an alloy has a mass per volume of 7.2 g/cm$^3$, an elongation to rupture A of the order of 10% and a melting temperature all comparable to those of alloys conventionally used in the optical trade, but has a yield point Rm of the order of 1000 Mpa, an elastic limit at ambient temperature of the order of 4% and an elastic stress threshold $\sigma_0$ (0.2) of the order of 500 Mpa, well above the values for conventional alloys, which results in a better rigidity of the material, hence a better strength of the frame. Thanks to its range of resilience, which is much greater (practically 20 times greater than those of conventional alloys) this Cu—Al—Be alloy fulfills two contradictory requirements of the optical trade: an elasticity allowing yielding deformation already under a low stress, but good rigidity in the absence of stress.

Selection of the bridges' elasticity thus permits the front-piece to be squashed instantaneously without breaking it, while ensuring that the lens rims are sufficiently rigidly held so that the lenses remain properly facing the wearer's eyes. Selection of the temples' elasticity enables them to be bent downwards or upwards, deliberately or accidentally, without a risk of rupture at the hinges 5 or lugs 4, in particular at their point of connection with the front-piece. This superelasticity of the temple is also advantageous for its earbend ends which are sufficiently flexible to fit around any ear but sufficiently rigid to hold the frame effectively relative to the wearer's face. If desired, the stems 7 for supporting the pads 8 may also be made of the Cu—Al—Be alloy so that these stems act somewhat like shock absorbers between the nose and the weight of the front-piece.

The austenitic transformation temperature As is of the order of −100° C., plus or minus about 10° C., which enables the limit of the domain of stability of this austenitic phase to be situated at a temperature lower than the normal range for use of spectacle frames which is −30° C. to +80° C. Furthermore, this alloy has a Young's modulus of the order of 70 Gpa and a Vickers hardness Hv of the order of 300.

The unfinished superelastic alloy is produced at the foundry in the form of a wire which can then be made into wires of different diameters commonly comprised between 1 mm and 2 mm (1–2 mm) and of different cross-sectional shapes (circular, rectangular, etc.) using drawplates. The thus-obtained wire is then electrochemically degreased to remove from its surface graphite used as cement to facilitate the drawing operation. At this stage, the wire has a slightly granular surface referred to as "orange peel".

A cut section of wire, having superelasticity fixed at a well determined value as set out above, can then undergo a mechanical hammering or forming operation at low temperature to confer its final shape, in the case of a temple to make one thicker end with a male hinge element.

It has been found preferable to carry out this forming/hammering in several passes, each of which does not exceed a deformation of 5/100 mm (and not exceeding a shrinkage of 40%), above which value there is a risk that the part may disintegrate. This shaping may be carried out directly by hot or cold forming. Relaxation of stresses thus-produced is obtained by a thermal beta treatment at a temperature above 650° C. during a relatively short time. A superior result is obtained with a thermal treatment at 850° C. during 10 to 15 seconds depending on the mass to be heated, and a rapid cooling, for example by quenching in cold water (20° C.) or under an air jet.

This hammering operation incidentally has the advantage of smoothening the surface by removing the superficial granulosity resulting from degreasing.

It is also possible to carry out hot forming to obtain, in a single passage by drawing or bending a wire, a part of relatively complex final shape, for example an arched bridge or a bridge arched at one end and whose other end terminates with a curved lug to be laterally secured to the front-piece.

In this case, this treatment should be performed at a temperature above 650° C. to conserve the austenitic phase of the alloy and to avoid stresses causing the formation of martensite or the precipitation of intermetallic components (phase γ2). Preferably, this treatment is carried out rapidly to avoid grain enlargement that would modify the alloy's expected properties.

By way of example, a bridge shaped at a temperature of 860° C. after heating lasting about 13 seconds, then cooled rapidly by quenching in water, has, depending on its diameter, a superelasticity comprised between 2% and 10%, an elastic limit $\sigma_0$ (0.2) comprised between 400 Mpa and 500 Mpa, a yield point comprised between 750 Mpa and 900 Mpa and an extension to rupture comprised between 15% and 20%. The mean grain size is of the order of 0.12 mm.

The bridges 2 and 3 are connected to the rims 1 directly by brasing preferably using a silver-based solder. Induction brasing is particularly suited, because it permits controlled local heating. In particular, the alloy's good electrical conductivity enables reduction of the heating time. A protective gas atmosphere is necessary, for example cracked ammonia, and rapid cooling must be ensured. It becomes all the more necessary to follow these operating precautions as the diameter of the wire is reduced, especially under 1.6 mm. Workshop tests have demonstrated that this welding by brasing can withstand a traction of 600 Mpa. However, stresses of such values can in practice practically never be produced at the welds due to the fact that the superelastic bridges have already completely bent, and this without any residual deformation.

Preferably, each component of the frame and especially those of superelastic alloy according to the invention is electroplated with a levelling surface layer of copper or nickel. This layer serves as a uniform base over the entire frame for a decorative deposit of precious metal, notably of gold. The superelastic alloy's composition facilitates this coating which permits the superelastic piece to be integrated without difficulty into a decorative assembly.

Many improvements may be made to these spectacle frame elements within the scope of the claims.

What is claimed is:

1. A frame for spectacles comprising at least one element made of a polycrystalline Copper—Aluminum—Beryllium (Cu—Al—Be) alloy of elasticity comprised between 3% and 6%, wherein the composition of the polycrystalline alloy is from 0.5% to 1% Beryllium, from 11% to 12% Aluminum, and the remainder Copper.

2. The frame for spectacles according to claim 1, wherein the mean grain size of the polycrystalline alloy is less than 0.12 mm.

3. The frame for spectacles according to claim 2, wherein the Cu—Al—Be element is shaped by one or more hammering operations not exceeding 5/100 mm of deformation per passage, or 40% shrinkage.

4. The frame for spectacles according to claim 3, wherein after a shrinkage operation the Cu—Al—Be element undergoes a thermal treatment at a temperature exceeding the allotopic transformation temperature of the alloy, of the order of 650° C., followed by rapid cooling.

5. The frame for spectacles according to claim 2, wherein the shaping of the Cu—Al—Be element is carried out at a temperature above 650° C. after a heating time less than 15 seconds per gram of material to be heated, this shaping being followed by rapid cooling to ambient temperature.

6. The frame for spectacles according to claim 2, wherein the Cu—Al—BE element is assembled to another part by brasing with a silver-based solder in paste or wire form, at a temperature of the order of 700° C. using local induction heating.

7. The frame for spectacles according to claim 1, wherein the Cu—Al—Be element is shaped by one or more hammering operations not exceeding 5/100 mm of deformation per passage, or 40% shrinkage.

8. The frame for spectacles according to claim 7, wherein after a shrinkage operation the Cu—Al—Be element undergoes a thermal treatment at a temperature exceeding the allotopic transformation temperature of the alloy, of the order of 650° C., followed by rapid cooling.

9. The frame for spectacles according to claim 1, wherein the shaping of the Cu—Al—Be element is carried out at a temperature above 650° C. after a heating time less than 15 seconds per gram of material to be heated, this shaping being followed by rapid cooling to ambient temperature.

10. The frame for spectacles according to claim 1, wherein the Cu—Al—BE element is assembled to another part by brasing with a silver-based solder in paste or wire form, at a temperature of the order of 700° C. using local induction heating.

11. The frame for spectacles according to claim 1, wherein the Cu—Al—Be element is plated with a surface layer of Copper or Nickel by a galvanic treatment and then coated with gold or palladium or another metal inert to the skin.

12. The frame for spectacles according to claim 1, wherein the composition of the polycrystalline alloy comprises approximately 0.63% Beryllium, approximately 11% to 12% Aluminum, and the remainder Copper.

13. The frame for spectacles according to claim 1, wherein the composition of the polycrystalline alloy comprises approximately 0.5% to 1% Beryllium, approximately 11.8% Aluminum, and the remainder Copper.

14. The frame for spectacles according to claim 1, wherein the composition of the polycrystalline alloy comprises approximately 0.63% Beryllium, approximately 11.8% Aluminum, and the remainder Copper.

* * * * *